United States Patent [19]
Babbitt

[11] 4,270,941
[45] Jun. 2, 1981

[54] APPARATUS FOR PROCESSING HEAT SOFTENED MINERAL MATERIAL

[75] Inventor: William M. Babbitt, Granville, Ohio

[73] Assignee: Owens-Corning Fiberglas Corporation, Toledo, Ohio

[21] Appl. No.: 59,834

[22] Filed: Jul. 23, 1979

Related U.S. Application Data

[63] Continuation-in-part of Ser. No. 888,052, Mar. 20, 1978, abandoned.

[51] Int. Cl.³ ............................................. C03B 37/02
[52] U.S. Cl. ............................................. 65/1; 65/2; 65/11 W; 65/346; 65/356
[58] Field of Search ................. 65/1, 2, 11 W, 12, 346, 65/356

[56] References Cited

U.S. PATENT DOCUMENTS

| | | | |
|---|---|---|---|
| 2,649,487 | 8/1953 | Phillips | 65/1 X |
| 3,264,076 | 8/1966 | Veazie et al. | 65/2 |
| 3,640,517 | 2/1972 | Sendt | 65/346 X |
| 4,125,387 | 11/1978 | Gutner | 65/2 |
| 4,153,438 | 5/1979 | Stream | 65/2 |

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

The present invention embraces method and apparatus for processing heat-softened mineral material. Heat-softened mineral material flows from a supply through a passage, such as the passage in a flow block member or a bushing block member, into a bushing. The heat-softened material is thermally conditioned in the passage by a heat pipe which is thermally isolated from the passage such that the heat pipe does not substantially act as a heat sink from the material to the passage.

9 Claims, 5 Drawing Figures

APPARATUS FOR PROCESSING HEAT SOFTENED MINERAL MATERIAL

This is a continuation-in-part of application Ser. No. 888,052 filed Mar. 20, 1978 now abandoned.

BACKGROUND OF THE INVENTION

This invention relates to a method of and apparatus for processing heat-softened material, such as glass, and more especially to a method and arrangement of feeding heat-softened glass to a stream feeder or bushing in a manner that thermally conditions the glass.

In a typical direct melt operation, glass batch is reduced to a molten state and refined in a furnace. The refined glass is flowed through a forehearth channel to openings in bottom of the channel. The glass flows downwardly through the openings to electrically heated stream feeders or bushings disposed in spaced relation along the forehearth. Streams of glass flow through orifices in the bushings and the streams are attenuated to filaments or fibers by well-known methods.

As the glass flows downward from the forehearth through a flow block and a bushing block into a bushing, a temperature gradient is produced in the molten glass. This temperature gradient can be caused by the flow block and the bushing block acting as heat sinks which cool the glass. The difference in temperature of the glass at the bushing block and the glass at the center of the passage in the bushing block can be 100° F. or more. Such glass, having a large temperature gradient, entering a bushing during the operation of the fiber forming process can cause a non-uniform heat pattern across the bottom plate of the bushing and an inefficient fiber forming operation. Such glass entering a fiber forming bushing can result in the production of fibers which do not meet processing specifications and can result in process interruptions.

SUMMARY OF THE INVENTION

The present invention comprises apparatus for forming molten mineral material into fibers. The apparatus comprises an assembly comprising an electrically heated bushing having openings through which molten mineral material flows as streams and an entrance passage for flow of molten material into the bushing. The apparatus further comprises a heat pipe within the assembly for thermally conditioning the material such that material supplied adjacent the openings in the bushing is generally of a uniform temperature throughout and means for thermally isolating the heat pipe from the assembly such that the heat pipe does not substantially act as a heat sink from the material to the assembly.

The present invention also comprises a method of processing heat-softened mineral material. The method comprises flowing the heat-softened material from a supply, through a passage and into a stream feeder, flowing the material past a heat pipe means in heat transfer relationship with the material in the passage to thermally condition the material in the passage, and thermally isolating the heat pipe from the passage so that the heat pipe does not act as a heat sink from the material to the passage.

An object of the invention is to provide an improved fiber forming method and apparatus.

Another object of the invention is to provide an improved bushing assembly with means comprising a heat pipe for thermally conditioning material flowing therethrough such that material supplied adjacent the openings in the bushing is generally of a uniform temperature throughout and such that the heat pipe is thermally isolated from the assembly.

Another object of the invention is to provide an improved method of processing heat-softened mineral material flowing through a passage where the material is thermally conditioned by a heat pipe and the heat pipe is thermally isolated from the passage.

Other objects and advantages will become apparent as the invention is described more clearly hereafter in detail with reference being made to accompanying drawings.

DESCRIPTION OF THE PREFERRED EMBODIMENT

Before explaining the present invention in detail, it is to be understood that the invention is not limited in its application to the details of construction and the arrangements of parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the method and apparatus of the invention have particular utility in the processing of mineral materials, such as glass, for forming fibers or filaments from streams of molten material supplied from bushings in a direct melt fiber forming operation, it is to be understood that the method and apparatus are not limited to a direct melt fiber forming operation. The invention can be used, for example, in other well-known glass fiber forming operations, such as the marble melt forming operation, the paramelt forming operation and the foremelter forming operation.

Figure 1:
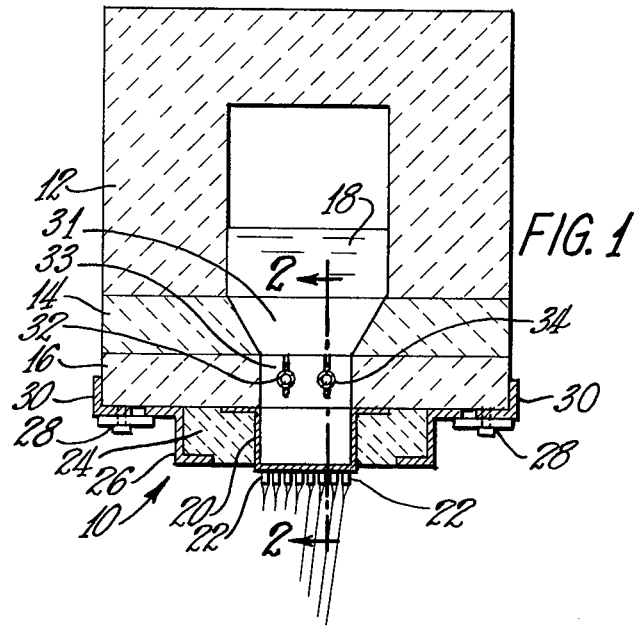
FIG. 1 is a semi-schematic sectional view of a forehearth and a bushing arrangement according to the principles of the invention.

FIG. 1 illustrates a forehearth construction of a direct melt system for supplying heat-softened glass to a plurality of stream feeders or bushings associated with the forehearth. The glass batch is introduced into a melting and refining furnace or tank (not shown) which reduces the batch to a molten state. The molten glass flows from the furnace through a forehearth to a series of electrically heated bushings positioned along the bottom surface of the forehearth.

FIG. 1 illustrates a cross-section view of forehearth assembly 10 at a bushing location. The glass in the forehearth is maintained in flowable condition by applying heat by means of burners or heaters (not shown) disposed along the inside of the forehearth channel. The forehearth assembly is generally a tunnel constructed of refractory material 12 through which molten glass material 18 flows. Along the forehearth are openings in the bottom of the forehearth adapted for generally vertical glass flow into stream feeders or bushings.

Glass 18 flows generally vertically from the forehearth opening through a passage in flow block 14 positioned below the forehearth. The glass then flows generally vertically from the flow block, through a passage in a bushing block and then into a bushing or stream feeder. As illustrated, in FIG. 1 flow block 14 is positioned below refractory material 12 of the forehearth. The flow block is adapted with a generally vertical passage 31 through which the molten glass material flows from the forehearth. Positioned below the flow bock is bushing block 16. The bushing block is adapted with a generally vertical passage 33 through which the molten glass material flows from the flow block passage to bushing 20. The electrically heated bushing is partially enclosed by a heat resistant material which supports the bushing sidewalls and flange. The bushing assembly also includes a metal frame or support 26 attached to the outside portion of the refractory material. This outside frame 26 is used in attaching the bushing assembly to the bushing block. As shown, the bushing block has a bracket support 30 along the outside edge of the bushing block and attaching bolt means 28 secures the bushing assembly to the bushing block.

The stream feeder or bushing is conventionally electrically heated by passing an electrical current therethrough. Conventionally, electrical bus bars are connected to terminals extending from bushing.

Streams of molten glass are supplied through openings or orifices in the bottom wall of the stream feeder for attenuation into fibers. The bottom wall of the bushing can be adapted with a plurality of tips 22 through which the molten glass material is supplied in the form of streams. Alternately, the bottom wall can be tipless, that is, can have a plurality of orifices penetrating therethrough through which the molten streams are supplied.

Means, such as a heat pipe, are associated with, and electrically separated from, the bushing assembly for thermally conditioning the material flowing therethrough such that the material supplied adjacent the openings in the bushing is generally of a uniform temperature throughout. A heat pipe means cools the hotter portions of the glass material and heats the cooler portions of the glass material flowing through the passage. This reduces the temperature differentials in the glass which results in a more uniform temperature throughout the molten material flowing into the bushing or stream feeder.

Generally, the heat pipe consists of a non-electrically energized vacuum chamber lined with a capillary structure or wick saturated with a volatile fluid. When heat is applied to one end of the heat pipe, the working fluid is vaporized and the vapor travels to the condensation end of the heat pipe where the vapor condenses and heat is ejected. The working fluid when condensed is drawn back to the "hot" end of the heat pipe by capillary action along the wick. Thus, a heat pipe immersed in a material removes heat from hot zones in the material and adds heat to cooler zones in the material thus reducing the temperature differentials in the materials so that the entire material is of a more uniform character. Heat pipes are commercially available and can be purchased from, for example, Electron Dynamics Division of Hughes Aircraft.

As shown in FIG. 1, heat pipes 32 and 34 are positioned within the passage of the bushing block. The heat pipes are electrically isolated from the electrically heated bushing. Electricity is not passed through the heat pipes for heating them. The molten glass material is thermally conditioned as it flows past the heat pipes in the passage.

Figure 2:
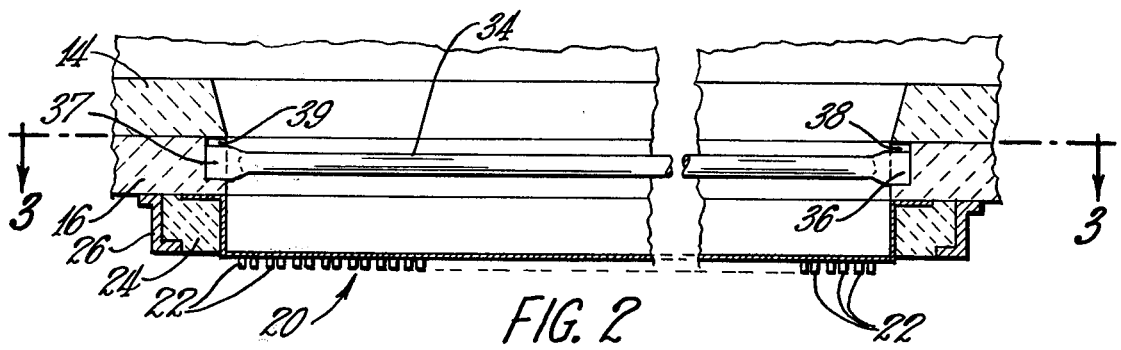
FIG. 2 is a cross-sectional view taken substantially along the line 2—2 of FIG. 1.
Figure 3:
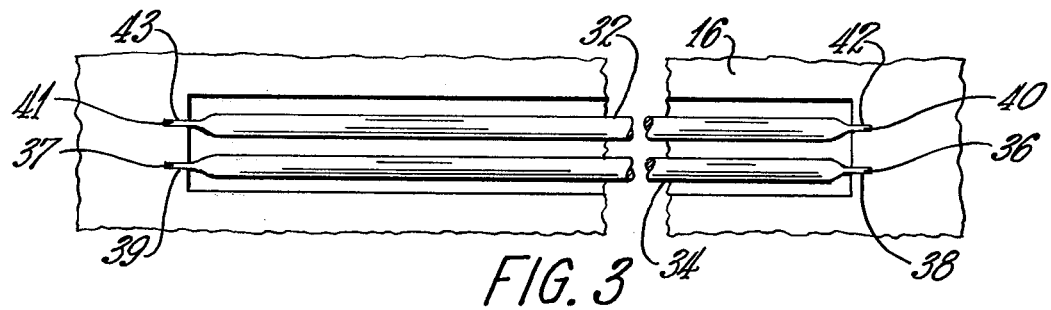
FIG. 3 is a cross-sectional view taken substantially along the line 3—3 of FIG. 2.

FIGS. 2 and 3 show the electrically separated or isolated heat pipe means of this invention in more detail. As shown, two heat pipe members are positioned in the flow passage. However, it is understood that one heat pipe or a plurality of heat pipes can be used. Also, it is deemed within the scope of the invention that heat pipes can be positioned at other locations such as in the bushing itself or in the flow block.

Figure 4:
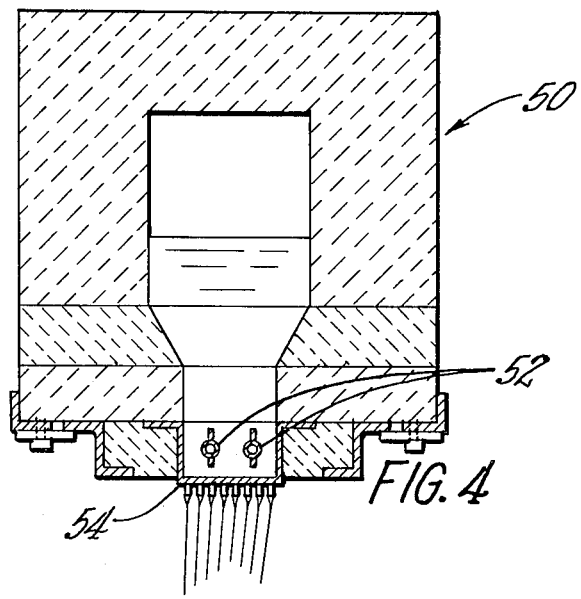
FIG. 4 is a semi-schematic sectional view of a forehearth and a bushing arrangement according to the principles of the invention.
Figure 5:
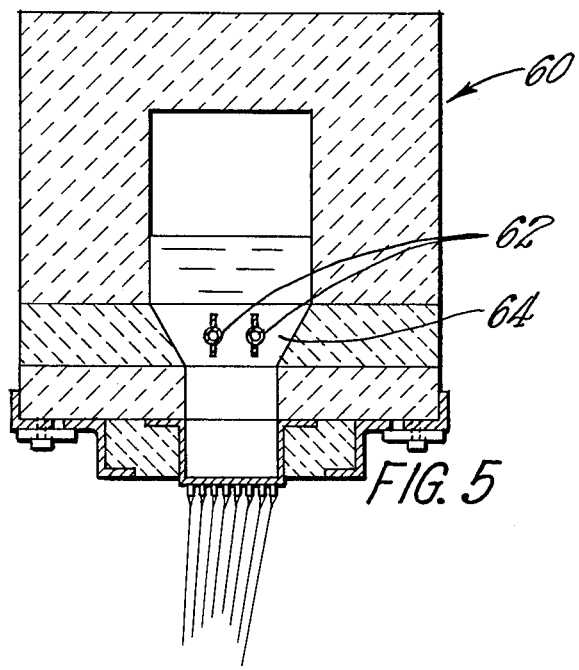
FIG. 5 is a semi-schematic sectional view of a forehearth and a bushing arrangement according to the principles of the invention.

FIGS. 4 and 5 are forehearth and bushing assemblies, 50 and 60, respectively, similar to that described in FIG. 1. In FIG. 4, electrically isolated heat pipe means 52 are positioned in bushing 54 to thermally condition the molten material therein. In FIG. 5, electrically isolated heat pipe means 62 are positioned in the flow block passage 64 to thermally condition the molten material therein. The heat pipe means in FIGS. 4 and 5 are similar to the heat pipe means described in regard to FIG. 1.

As shown, the heat pipe can be an elongated member which is generally cylindrical in shape except at its end regions. Heat pipes can be of other shapes and sizes. For example, a heat pipe can be generally flat and have a rectangular cross-section. Heat pipes can be generally straight, as shown, or they can have a curved configuration.

The heat pipes 32 and 34 are substantially thermally isolated from the walls of the flow passage. Thus, the heat pipes substantially only distribute heat within the flow of molten material and do not substantially act as heat sink members from the material to the passage to reduce the overall temperature of the flow of molten material. As shown in FIGS. 2 and 3, tabs or end regions of heat pipes 32 and 34 are solid members rather than being portions of the heat pipes themselves. These tab members 36, 37, 40 and 41 act to hold the heat pipe in place within the flow passage and to isolate the heat pipe from the walls forming the flow passage. It is well known that a heat pipe can transfer hundreds of times as much heat per unit weight as a solid conductor of the same cross section. Thus, the amount of heat transferred through the tabs from the heat pipe into the wall is insignificant as compared to the amount of heat transferred from hotter portions along the heat pipe to cooler portions along the heat pipe within the flow of material in the passage. The tabs can, for example, be of platinum rhodium alloy or of a ceramic material. Rather than acting as a heat sink, the heat pipes act to cool hotter portions and heat cooler portions of the glass material flowing through the passage. The thermally isolating tabs 36, 37, 40 and 41 fit into a series of notches or slots 38, 39, 42 and 43, respectively, to hold the heat pipe in position. As shown in FIGS. 2 and 3, the elongated heat pipe members extend across the passage, with the tabs members holding the heat pipes in position and thermally isolating them from the walls of the bushing block.

It will be evident from the foregoing that various modifications can be made to this invention. Such, however, are considered to be within the scope of the invention as described in the following claims.

I claim:

1. Apparatus for forming molten mineral material into fibers comprising:
   (a) an assembly comprising an electrically heated bushing having openings through which molten mineral material flows as streams and an entrance passage for flow of molten material into the bushing;
   (b) a heat pipe within the assembly for thermally conditioning the material such that material supplied adjacent the openings in the bushings is generally of a uniform temperature throughout; and
   (c) means for thermally isolating the heat pipe from the assembly such that the heat pipe does not substantially act as a heat sink from the material to the assembly.

2. The apparatus of claim 1 wherein the entrance passage comprises a bushing block having a passage extending therethrough for flow of material to the bushing and the heat pipe is positioned within the bushing block passage.

3. A bushing assembly for receiving molten mineral material from a supply to be attenuated into fibers comprising:
   (a) an electrically heated bushing adapted to receive the molten material and to supply a plurality of material streams therefrom;
   (b) a generally vertical passage adapted for flow of molten material from the supply to the bushing;
   (c) a heat pipe within the passage and in heat transfer relationship with the material in the passage adapted to thermally condition the material in the passage; and
   (d) means for substantially thermally isolating the heat pipe from the passage.

4. Apparatus for receiving molten mineral material from a supply to be attenuated into fibers comprising:
   (a) an electrically heated bushing adapted to receive the material and to supply a plurality of material streams therefrom;
   (b) means comprising a heat pipe internal of the bushing in heat transfer relationship with the material in the bushing adapted to thermally condition the material, the heat pipe being electrically and thermally isolated from the bushing.

5. A bushing block assembly for use in combination with a fiber forming bushing comprising:
   (a) a block member having a passage adapted for the flow of molten mineral material therethrough to the bushing; and
   (b) means comprising a heat pipe within the passage adapted to thermally condition the molten mineral material flowing through the block member, the heat pipe being thermally isolated from the passage such that the heat pipe does not substantially act as a heat sink from the material to the passage.

6. The apparatus of claim 5 wherein the molten mineral material is glass.

7. The apparatus of claim 5 wherein the heat pipe is of an elongated configuration.

8. The apparatus of claim 7 wherein the elongated heat pipe extends across the passage transversely to the flow of molten mineral material therethrough.

9. The apparatus of claim 5 wherein the means comprises a plurality of heat pipes.

* * * * *